United States Patent
Patil et al.

(10) Patent No.: US 10,944,630 B2
(45) Date of Patent: Mar. 9, 2021

(54) SEAMLESS AUTOMATION OF NETWORK DEVICE MIGRATION TO AND FROM CLOUD MANAGED SYSTEMS

(71) Applicant: Cisco Technology, Inc., San Jose, CA (US)

(72) Inventors: Santosh Ramrao Patil, Santa Clara, CA (US); Anvesh Reddy Podduturi, San Jose, CA (US); Sanalkumar Thekkanath, Santa Clara, CA (US); Vinay Prabhu, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/399,304

(22) Filed: Apr. 30, 2019

(65) Prior Publication Data
US 2020/0162318 A1 May 21, 2020

Related U.S. Application Data

(60) Provisional application No. 62/770,087, filed on Nov. 20, 2018.

(51) Int. Cl.
*H04L 12/24* (2006.01)
*G06F 9/4401* (2018.01)
*H04L 29/08* (2006.01)

(52) U.S. Cl.
CPC .......... *H04L 41/082* (2013.01); *G06F 9/4416* (2013.01); *H04L 41/046* (2013.01);
(Continued)

(58) Field of Classification Search
CPC ... G06F 9/4416; G06F 9/5072; H04L 41/046; H04L 41/0809; H04L 41/082;
(Continued)

(56) References Cited

U.S. PATENT DOCUMENTS 8,856,293 B1 * 10/2014 Sadry .................. H04L 67/1097
709/221
9,892,207 B2 2/2018 Schmidt et al.
(Continued)

OTHER PUBLICATIONS

Velostrata, "Purpose-Built, Enterprise-Grade Migration to Google Cloud," cloud.google.com, accessed on Dec. 18, 2018, pp. 1-9.
(Continued)

*Primary Examiner* — Gil H. Lee
(74) *Attorney, Agent, or Firm* — Polsinelli PC

(57) ABSTRACT

The present technology is directed to an automated end to end network migration process from on-premise to cloud-based management platforms and visa-versa. The disclosed technology describes an enhanced plug and play (PnP) software agent operationally coupled to a device and capable of interacting with a PnP service hosted on a target management platform to thereby initiate the migration process. The PnP service on the target management platform upon receiving a migration request from the device PnP agent, maps the requesting device onto a client profile existing on the target management platform and identifies therefrom the associated default controller for the device. Subsequently, the device is directed to acquire and boot up on a new software image compatible with the target management platform and following a conversion of its existing configuration into a version compatible with the new software image, the device is migrated to the associated default controller.

20 Claims, 9 Drawing Sheets

(52) U.S. Cl.
CPC .......... *H04L 41/0886* (2013.01); *H04L 41/22* (2013.01); *H04L 67/10* (2013.01); *H04L 67/1097* (2013.01)

(58) Field of Classification Search
CPC . H04L 41/0886; H04L 41/22; H04L 41/5041; H04L 67/10; H04L 67/1097; H04L 67/34
See application file for complete search history.

(56) References Cited

U.S. PATENT DOCUMENTS

| | | | |
|---|---|---|---|
| 9,942,323 B2 | 4/2018 | Vasetsky et al. | |
| 2010/0275203 A1* | 10/2010 | Shinohara | G06F 9/45558 718/1 |
| 2012/0311106 A1* | 12/2012 | Morgan | H04L 41/0813 709/220 |
| 2013/0282791 A1* | 10/2013 | Kruglick | G06F 16/119 709/203 |
| 2017/0187565 A1 | 6/2017 | Meng et al. | |
| 2020/0076689 A1* | 3/2020 | Chandrashekar | H04L 41/0813 |

OTHER PUBLICATIONS

Rabetski et al., "Migration of an On-Premise Application to the Cloud: Experience Report," www.cse.chalmers.se, accessed on Dec. 18, 2018, pp. 1-38.

"Migrating Applications to Public Cloud Services: Roadmap for Success Version 2.0," www.omg.org, Feb. 2018, pp. 1-38.

International Search Report and Written Opinion from the International Searching Authority, dated Feb. 26, 2020, 14 pages, for corresponding International Patent Application No. PCT/US2019/061170.

* cited by examiner

SEAMLESS AUTOMATION OF NETWORK DEVICE MIGRATION TO AND FROM CLOUD MANAGED SYSTEMS

CROSS-REFERENCE TO RELATED APPLICATIONS

This application claims priority to U.S. Provisional Patent Application No. 62/770,087, filed on Nov. 20, 2018, the content of which is incorporated herein by reference in its entirety.

TECHNICAL FIELD

The present technology pertains to systems and methods for management of network devices. More specifically it is directed to automated cross-platform migration of network devices.

BACKGROUND

The simplicity, ease of use and manageability of cloud-based network systems has prompted the networking industry to increasingly adopt cloud-managed networking solutions. One challenge facing the industry involves the seamless conversion of a large number of conventionally deployed networking devices into cloud-managed networking products.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DESCRIPTION OF EXAMPLE EMBODIMENTS

Figure 1:
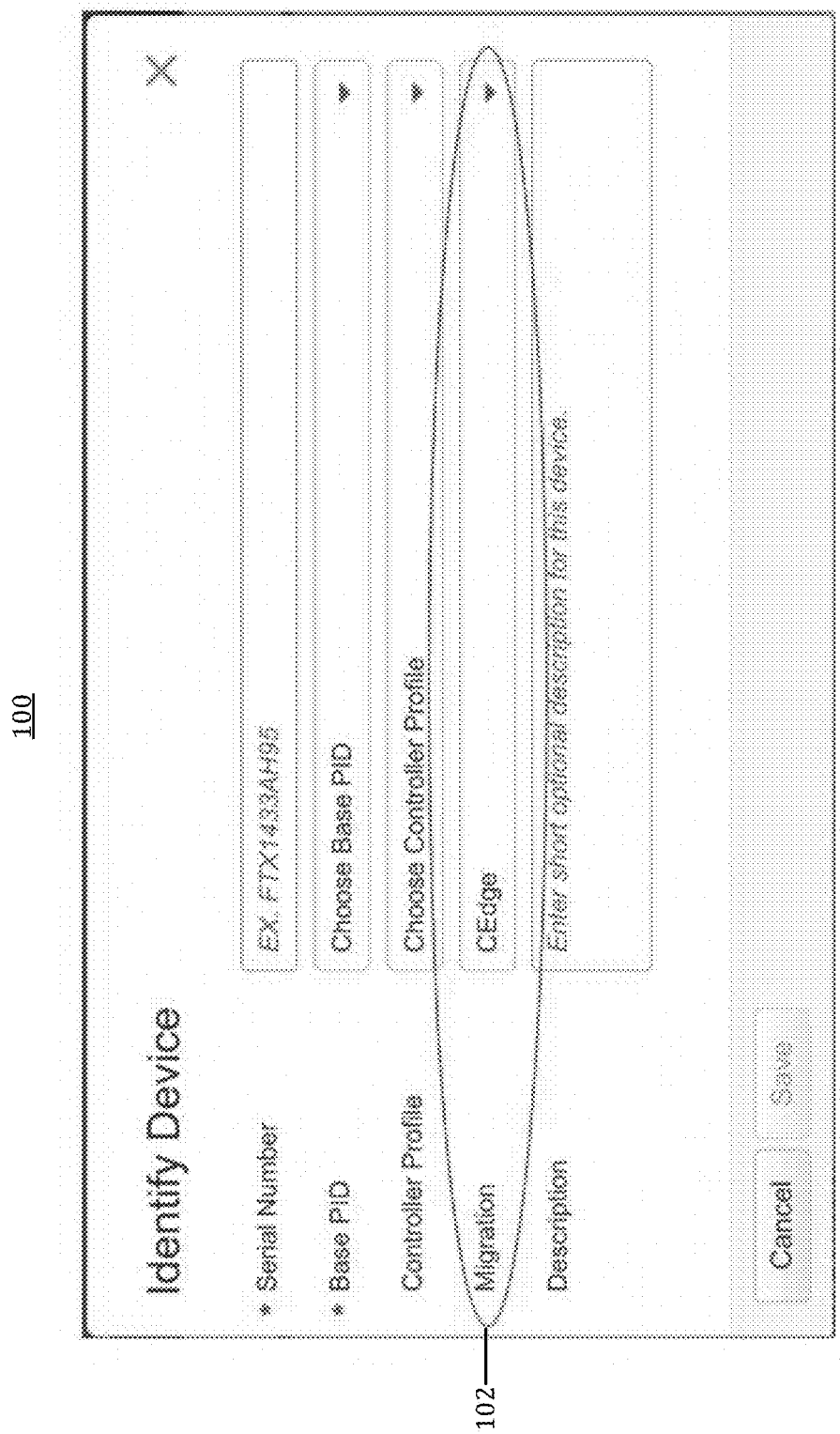
FIG. 1 illustrates an example user interface for initiating platform migration for a network device, in accordance with some embodiments of the present technology.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Disclosed are systems, methods, and computer-readable media for seamless automation of network migration between on-premise and cloud-managed systems.

In some aspects of the present technology, a method includes receiving, by a first server hosted on a first management platform, a migration request associated with an identifier for a device hosted on a second management platform. The method further includes mapping the identifier to a client account on the first management platform, and directing the device to boot up on a software image provided by a second server on the first management platform. Moreover, the method involves updating, by the first server, an existing configuration of the device for compatibility with the software image provided by the second server, and migrating the device to a host controller on the first management platform identified from the client account.

DETAILED DESCRIPTION

As cloud-managed networking gains popularity, many networking vendors are faced with the challenge of investing the time and resources necessary for migrating the existing population of on-premise managed or conventionally deployed (BROWNFIELD) devices onto cloud-based platforms. The conventional approach for performing a cloud-based platform migration for conventionally deployed network devices involves performing a manual download of relevant software and device image files, followed by a manual conversion of existing device configuration (i.e., input configuration) to a cloud recommended version (i.e., output configuration). This is a time-consuming process requiring multiple manual steps which adds to the complexity and the turnaround time of the task. Furthermore manually modifying the configuration of on-premise managed devices for cloud compatibility and vice-versa is prone to human error and requires a certain level of expertise and experience, which itself is a limited and valuable resource.

An alternative approach that significantly reduces the turn-around time, as well as the required effort/expertise and the complexity associated with performing network migration between disparate management platforms, may be greatly beneficial to network vendors and end users alike. Accordingly, some aspects of the present technology disclose a robust, efficient and fully automated mechanism to seamlessly migrate networking devices from on-premise to cloud-managed system and vice-a-versa in an operationally flexible manner that significantly reduces the associated complexity and the turnaround time.

A fully automated process for facilitating bi-directional network migration between on-premise based and cloud-based network management platforms, as described in accordance with some embodiments of the present technology, significantly minimizes the involvement of an end-user in the migration process. This may be achieved, in accordance with some embodiments of the present technology, by enabling a device to communicate a migration intent to the cloud using an embedded software component such as a Plug and Play (PnP) agent that may be installed onto or operationally coupled with the device. A user may communicate/interact with the PnP software agent using a CLI wrapper which is an executable command line wrapper for enabling communication with the PnP software agent on the network device using, for example, one or more CLI commands. For example, the PnP (software) agent may receive, through the CLI wrapper, a user-provided CLI command for migration onto a cloud host. This may trigger the PnP agent to initiate the process of initial discovery and connection to an onboarding cloud server. After a cloud onboarding server (i.e., a Cisco PnP redirect server) is found and a connection has been established, the PnP agent may send a conversion or migration request to the cloud-hosted onboarding server to initiate the migration process. In this way, the migration process may be initiated in response to a simple CLI command input from a user.

The PnP software agent functionality may consist of initiating a connection to a cloud onboarding server, following an initial discovery phase, and sending a migration request to the cloud onboarding server to thereby initiate the cloud migration process. The PnP agent may be initialized in response to a user-provider CLI command provided through a CLI wrapper. Furthermore, a web user interface used for configuration management may be enhanced to support the CLI wrapper such that a user may simply initiate the migration process from the web user interface by a single action (i.e., a click of a button). The PnP agent may also be triggered to initiate the migration process through a mobile application with, for example, a graphical user interface and a wireless connection (i.e., Bluetooth). The mobile application may then communicate with the network device and initiate the migration process via the CLI wrapper. FIG. 1 illustrates an example user interface 100, associated with Cisco Plug and Play Cloud portal for device migration. In the example user interface 100, a migration request as specified by a user selection corresponding to field 102 involves a conversion from an on-premise managed network device (i.e., Cisco's Viptela ISR device) to a cloud managed network device (i.e., cloud-based cEdge device).

According to some embodiments of the present technology, an existing software component of a device (i.e., a device agent) may be enhanced to periodically save a running configuration of the device to a location that is safe from being erased by a factory reset. Additionally, the (enhanced) device agent may replace a configured profile associated with an existing controller/management server with the profile configuration that identifies a cloud-hosted onboarding server. In accordance with some embodiments, an enhanced (PnP) device agent associated with a network device may automatically trigger a connection request to a cloud onboarding server when a device is reset (i.e., upon recovering from a reset operation). In this case, a single user-initiated device reset operation would automatically generate a connection request to the cloud.

With reference to the described scenario, if the connection request is not followed by a migration request, a network administrator/operator may need to flag the device for migration with the appropriate cloud service (i.e., an onboarding server) on the target platform. The onboarding server may then verify to see if a connecting device is flagged for migration with a cloud service (based on, for example, device serial number) before initiating the migration process in response to a communication from a particular device.

Another feature of the fully automated bi-directional network migration process as disclosed by some embodiments of the present technology involves the automatic retrieval of necessary information to facilitate the cloud migration process. The information retrieval is based on a successful association of the to-be-migrated device with, for example, an account profile for an existing cloud-based client/network. Identifying the client account associated with the requesting device enables the onboarding server to retrieve information such as the default cloud-based controller/management server for the client/organization and the recommended cloud-compatible software image which may be specified in a client's account profile. If the provided device information (i.e., a device serial number) is not matched to an existing client account, a source IP address of the device may be used to identify a related cloud-based device from among the existing cloud-managed devices (i.e., a previously migrated devices belonging to the same network/organization as the to-be-migrated device.)

In accordance with some embodiments of the present technology, a cloud-based onboarding server may identify a default cloud-based host and a cloud-compatible software image for the requesting device, by mapping the device information to one or more client records in, for example, an accounts database (i.e., Cisco Smart Account database.) If the device is successfully mapped to an existing client account, information that may be required to automate the cloud deployment, such as the cloud-based default host controller for hosting the particular device and the cloud recommended device software image may be retrieved.

In accordance with some embodiments of the present technology, in the absence of a successful mapping of the device identifier (i.e., serial number) to an existing client account, an onboarding server may check a source IP of the (to-be-migrated) device and search an inventory of existing cloud-based devices for a device originating from the same network/organization based on a comparison of the source IPs. If such a match is found, necessary information may be retrieved from the matched client/organization account (i.e., client smart account) associated with the cloud-based device. A smart account may contain additional information, such as the cloud-platform compatible device image to be pushed onto a migrating device, that may be required for completing the migration process.

Once the cloud onboarding server associates a migrating device with an existing client/network account, the onboarding server may redirect the device to a cloud-based central management server (i.e., DNA-C server) for the purpose of upgrading the device image to a cloud recommended software image specified in a client account (i.e., Cisco smart account). Once the image has been upgraded to a cloud-recommended image, the existing configuration on the device (i.e., input configuration), previously transmitted to the onboarding server along with the migration request, may be converted to an output configuration that is compatible with the new cloud-recommended image and the new configuration (i.e., the output configuration) is pushed onto the device. After successfully applying the configuration, the cloud onboarding server device may redirect the device to its default cloud-based host controller (i.e., default host controller) specified, for example, in a client's Account or metadata.

Figure 2:
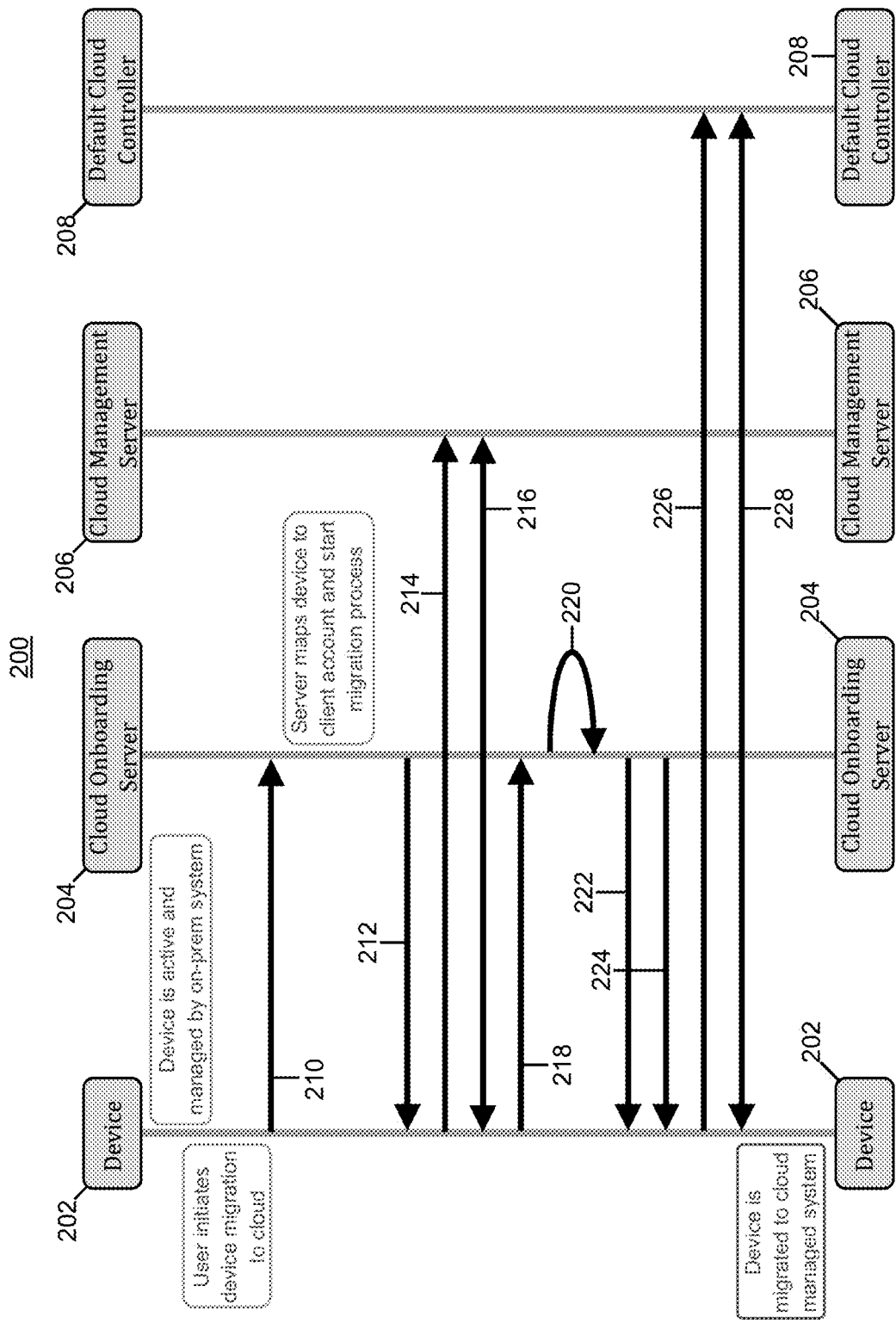
FIG. 2 illustrates an example process flow for an end to end automation of network migration to and from cloud-managed platform, in accordance with some embodiments of the present technology.

FIG. 2 illustrates an example flow diagram 200 for end to end seamless migration of a BROWNFIELD (previously deployed) device onto a cloud-managed network, in accordance with some embodiments of the present technology. With reference to the flow diagram 200, the device 202 is to be migrated onto a cloud-based management platform comprising at least of a cloud-based onboarding server 204, a cloud-based central management server 206 (i.e., DNA-C server), and one or more default cloud controllers denoted as 208. Device 202 may comprise a PnP agent for initiating a connection to the cloud onboarding server 204 which may function as a PnP server.

Prior to the initiation of the flow, device 202 is active and hosted on on-prem network. At this point device, 202 is not capable of connecting to a cloud. A user may initiate device migration to the cloud by, for example, entering a configuration command on the device expressing an intent to migrate onto a cloud. This action may automatically generate a migration request 210 that is transmitted to the cloud onboarding server 204 following the execution of an initial discovery and connection routine by the PnP agent on device 202. The existing device configuration may also be sent to the cloud onboarding server 204 along with the migration request.

The cloud onboarding server 204, upon receiving the migration request 210, will attempt to map an identifier of the requesting device 202 to an existing client account to retrieve information such as the identity of a cloud controller that may serve as a cloud hosting endpoint for the requesting device 202. This may be required for discovering the identity of the particular cloud host (i.e., Default Cloud host Controller 208) onto which the device will eventually be migrated. Once the onboarding server identifies a source network/client associated with the device, it will associate the default host controller designated to that network/client with the requesting device 202. The migration process continues as the (cloud-based) onboarding server 206 sends a redirect response 212 to redirect the device to the (cloud-based) central management server 206 for upgrading the device image to a version recommend for the default cloud controller 208. The recommended device image may be specified in the client account or as part of client metadata or simply identified by the cloud-based central management server 206, based on specifications of the default controller host 208. A redirection request for migration (214) is dispatched to the DNA-C server 206 by the device. The cloud-based central management server (i.e., DNA-C server) 206 may initiate the device image upgrade by, for example, redirecting the device to a data entry server dedicated to software image upgrades with instructions to download and install the identified software image. The DNA-C server directs the requesting device 202 to download the recommended software image and issues specific instructions to have the device rebooted with the newly downloaded software image, as denoted by the operation flow line 216.

At the end of 216, the device is booted up with a new software image. The device, at the start of the boot-up, may again come back to the onboarding server with a work request 218 to check if there is anything else to be done. The cloud onboarding server 204, upon receiving the work request, will convert the existing configuration of the device, received from the device at 210 along with a migration request to a version that is compatible with the new software image configuration (220).

The cloud onboarding server 204 sends the updated configuration back to the device (222), along with a redirect request 224 instructing the device to contact its default controller 208 to complete the migration process. Accordingly, device 202 initiates a connection request 226 to its default cloud host (i.e., default cloud controller 208). Subsequently, the default cloud controller 208 establishes connectivity to the device and takes over its management (228). Once the connection to the default cloud controller 208 is established (228), the usual cloud management operation may start.

Although the described example involves a migration flow direction from on-prem to cloud-based platform, the similar set and sequence of operation including automatically initiating a migration process with an on-prem onboarding server and automatically replacing cloud-recommended device image and configurations with those associated with on-prem management platform which may then be pushed onto a cloud-hosted device to convert it to an on-prem managed device.

Figure 3:
FIG. 3 illustrate an example cloud-platform user interface for management of the migration process, in accordance with some embodiments of the present technology.

FIG. 3 illustrates a snapshot of a user cloud interface 300 for facilitating device migration from on-premise managed platform to a cloud-managed platform and vice versa. With reference to snapshot 300, the example user interface in FIG. 3 also provides migration status monitoring capability on one or more relevant devices. According to the snapshot provided in FIG. 3, device migration status may be communicated with textual and/or graphical elements. For example, row entries 302, 304 and 306 respectively correspond to a successful, pending and faulty migration conditions.

Figure 4:
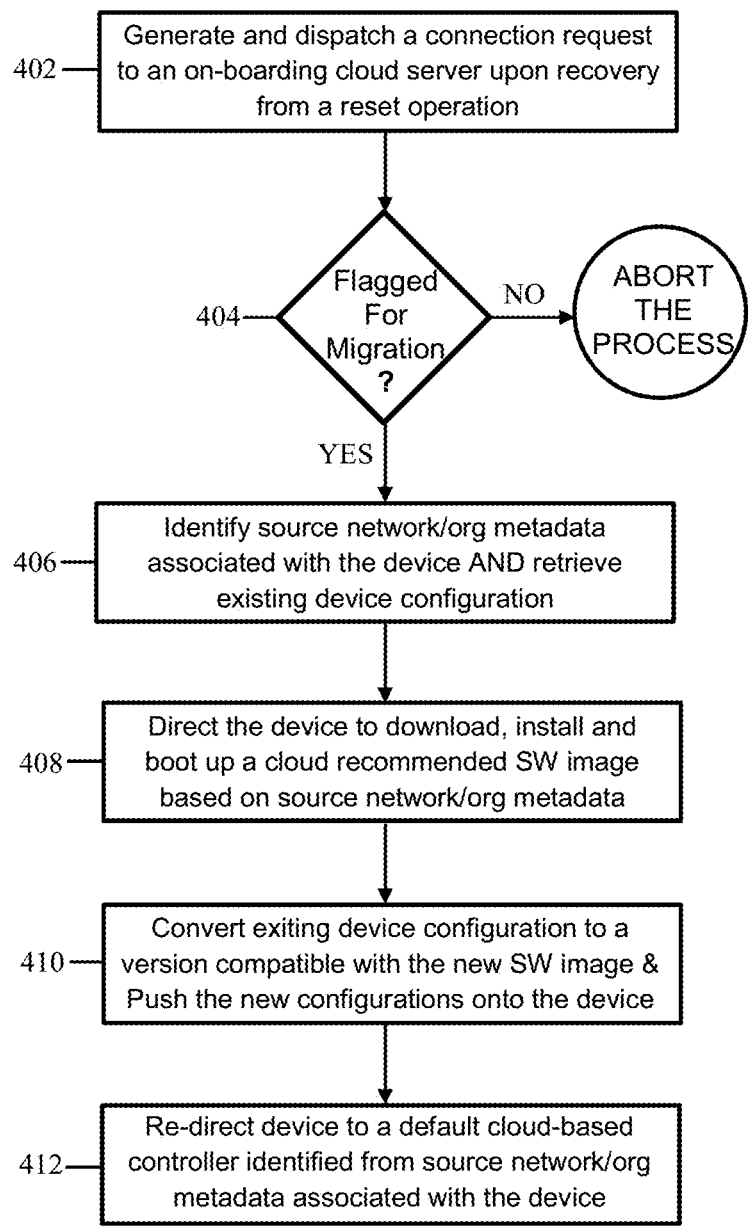
FIG. 4 illustrates a flow chart directed to an example workflow for seamless automation of device migration process to and from a cloud-managed platform, in accordance with some embodiments of the present technology.

FIG. 4 illustrates a flow chart 400 for describing an example end-to-end operational flow for an automated cloud migration mechanism, in accordance with some embodiment of the present technology. The example end-to-end operational flow in FIG. 4 corresponds to an automatic initiation of a cloud migration process triggered by resetting a device featuring an enhanced PnP agent. Referencing flow chart 400, at step 402 a device generates a connection request to a cloud PnP server (i.e. cloud onboarding server) automatically following a user-initiated reset operation. At step 404 the cloud PnP server/onboarding server verifies that the connecting device is flagged for migration with the appropriate cloud service (i.e., PnP server). If the device (i.e., as identified, for example, by an associated serial number) is not flagged for migration the workflow is aborted (405). Otherwise, the operation moves to step 406 wherein existing device configuration information is collected from the device by the onboarding server. Additionally, at step 406, a cloud onboarding server may query one or more appropriate sources (i.e., clients account database) to identify and retrieve metadata records relevant to the migration process (i.e., cloud-recommended software image and the default controller host associated with the device). This may be accomplished, in accordance to some embodiments of the present technology, by matching the device serial number or one or more portions of the device source IP address against, for example, existing inventory of records. Once metadata or account information associated with the source network/ organization to which the device belongs is identified and collected along with the existing device configuration, the operation moves to step 408, wherein a cloud management server (i.e., DNA-C server) directs the device to an appropriate source for downloading, followed by specific instructions for installing and booting up, a cloud-recommended software image. Once the device is booting up on the new image the operation moves to step 410, whereby the existing device configuration, retrieved by the cloud onboarding server at step 406, is converted to a version compatible with the new cloud-recommended software image. Finally, at step 410, the cloud onboarding server redirects the device to its default cloud controller host identified at step 406, at which point the device may be fully managed through the cloud. Some embodiments of the present technology propose an end to end automated mechanism for migration of networking device from on-premise to a cloud managed network and vice-a-versa. Accordingly, some embodiments of the disclosed technology combine various tools and mechanism which were previously used in isolation into a single automated mechanism with additional novel aspects. For example, embodiments of the present technology provide a novel way to enhance current PnP agent on a device to trigger migration as well as retain and share the existing configuration on the device for conversion. With an enhanced Plug and Play (PnP) agent on a device—embodiments of the present technology provide true zero-touch migration solution for the end user with just a need to reset the device to initiate an automated process to carry out the desired migration. Embodiments of the present technology, further provide a novel way to detect and map the device to its smart account or source network based on matching a device source IP with that of existing cloud-managed devices. Other embodiments may utilize an existing serial number on the device for mapping to a smart account record.

In accordance with some embodiments, the present technology may be implemented in the context of a Cisco's Digital Network Architecture Center (DNA-C) which is a foundational controller and analytics platform for an intent-based enterprise network.

Figure 5:
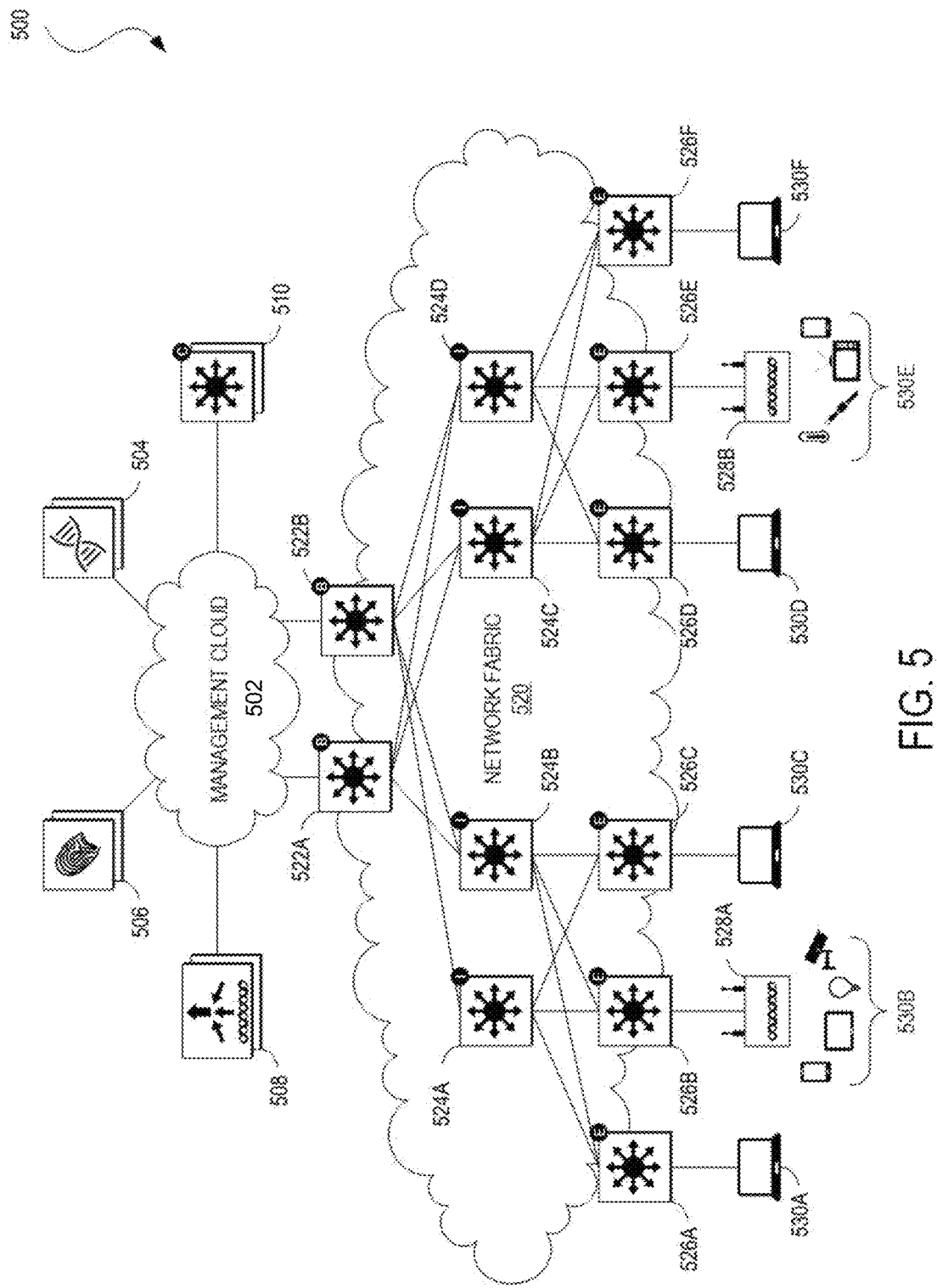
FIG. 5 illustrates an example of a physical topology of an enterprise network, in accordance with some embodiments of the present technology.
Figure 6:
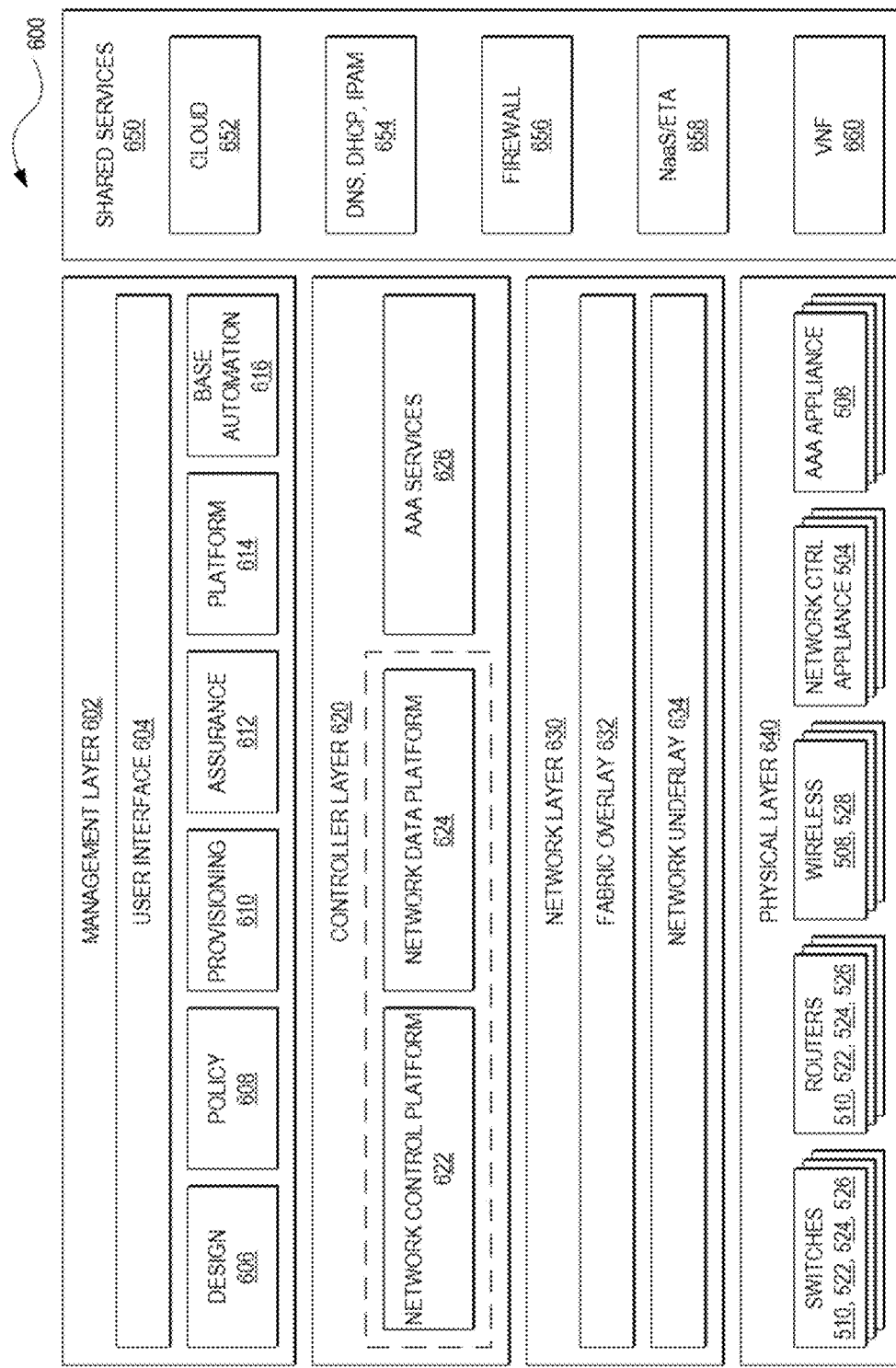
FIG. 6 illustrates an example of a logical architecture for an enterprise network, in accordance with some embodiments of the present technology.
Figure 7:
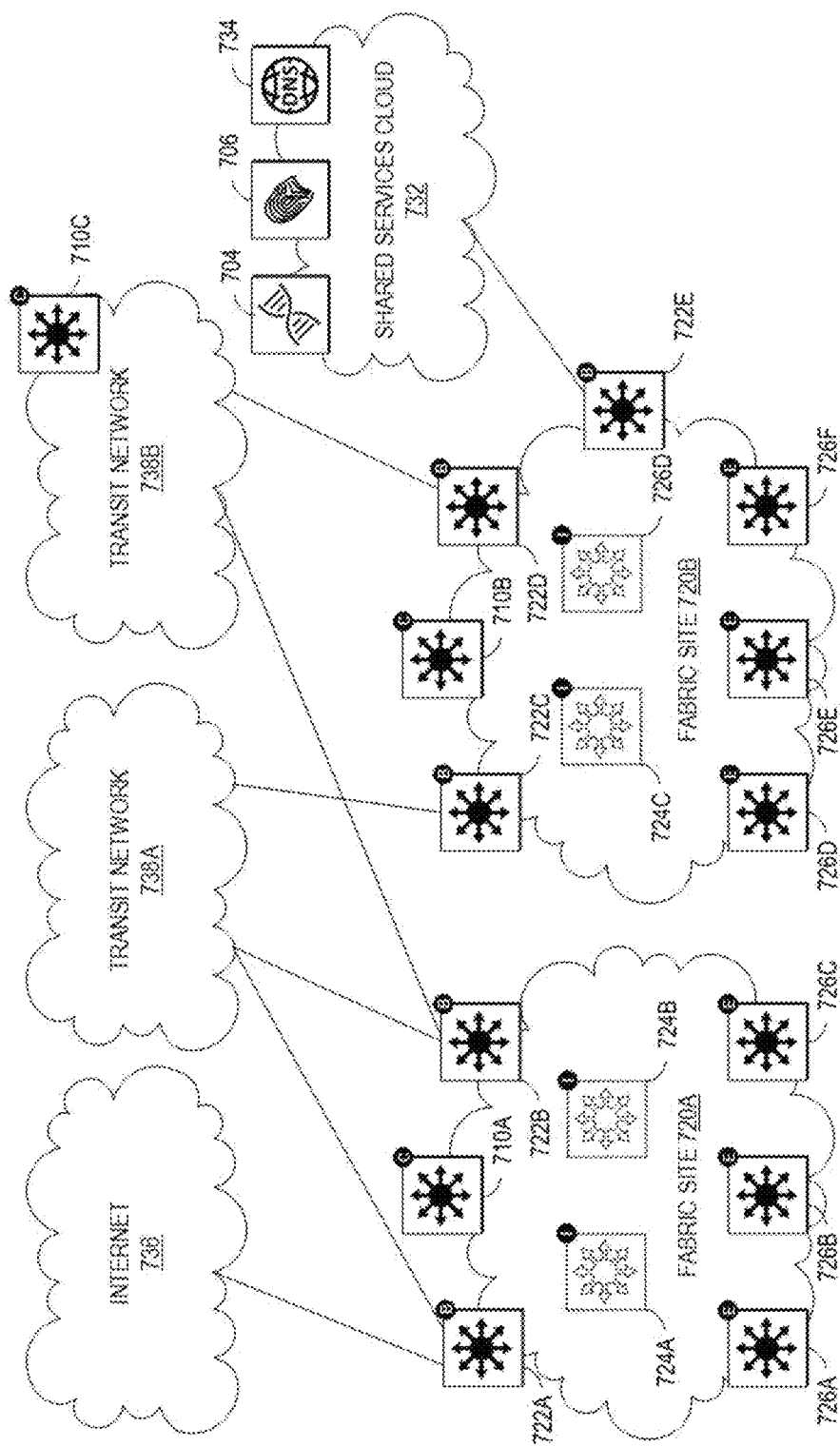
FIG. 7 illustrates an example of a physical topology for a multi-site enterprise network, in accordance with some embodiments of the present technology.

The disclosure now turns to FIGS. 5, 6 and 7 to provide a structural and operational description of some aspects of DNA-C.

FIG. 5 illustrates an example of a physical topology of an enterprise network 500 for providing intent-based networking. It should be understood that, for the enterprise network 500 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 500 can include any number or type of resources, which can be accessed and utilized by endpoints or network devices. The illustrations and examples provided herein are for clarity and simplicity.

In this example, the enterprise network 500 includes a management cloud 502 and a network fabric 520. Although shown as an external network or cloud to the network fabric 520 in this example, the management cloud 502 may alternatively or additionally reside on the premises of an organization or in a colocation center (in addition to being hosted by a cloud provider or similar environment). The management cloud 502 can provide a central management plane for building and operating the network fabric 520. The management cloud 502 can be responsible for forwarding configuration and policy distribution, as well as device management and analytics. The management cloud 502 can comprise one or more network controller appliances 504, one or more authentication, authorization, and accounting (AAA) appliances 506, one or more wireless local area network controllers (WLCs) 508, and one or more fabric control plane nodes 510. In other embodiments, one or more elements of the management cloud 502 may be co-located with the network fabric 520.

The network controller appliance(s) 504 can function as the command and control system for one or more network fabrics and can house automated workflows for deploying and managing the network fabric(s). The network controller appliance(s) 504 can include automation, design, policy, provisioning, and assurance capabilities, among others, as discussed further below with respect to FIG. 6. In some embodiments, one or more Cisco Digital Network Architecture (Cisco DNA™) appliances can operate as the network controller appliance(s) 504. Other examples of network controller appliances may be provided by cloud onboarding server 204 and cloud management server 206 represented in FIG. 2. The automation process for seamless end-to-end migration across management platforms, as described by some embodiments of the present technology, may be implemented in a context of one or more network controller appliances.

The AAA appliance(s) 506 can control access to computing resources, facilitate enforcement of network policies, audit usage, and provide information necessary to bill for services. The AAA appliance can interact with the network controller appliance(s) 504 and with databases and directories containing information for users, devices, things, policies, billing, and similar information to provide authentication, authorization, and accounting services. In some embodiments, the AAA appliance(s) 506 can utilize Remote Authentication Dial-In User Service (RADIUS) or Diameter to communicate with devices and applications. In some embodiments, one or more Cisco® Identity Services Engine (ISE) appliances can operate as the AAA appliance(s) 506.

The WLC(s) 508 can support fabric-enabled access points attached to the network fabric 520, handling traditional tasks associated with a WLC as well as interactions with the fabric control plane for wireless endpoint registration and roaming. In some embodiments, the network fabric 520 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 508.

The network fabric 520 can comprise fabric border nodes 522A and 522B (collectively, 522), fabric intermediate nodes 524A-D (collectively, 524), and fabric edge nodes 526A-F (collectively, 526). Although the fabric control plane node(s) 510 are shown to be external to the network fabric 520 in this example, in other embodiments, the fabric control plane node(s) 510 may be co-located with the network fabric 520. In embodiments where the fabric control plane node(s) 510 are co-located with the network fabric 520, the fabric control plane node(s) 510 may comprise a dedicated node or set of nodes or the functionality of the fabric control node(s) 510 may be implemented by the fabric border nodes 522.

The fabric control plane node(s) 510 can serve as a central database for tracking all users, devices, and things as they attach to the network fabric 520, and as they roam around. The fabric control plane node(s) 510 can allow network infrastructure (e.g., switches, routers, WLCs, etc.) to query the database to determine the locations of users, devices, and things attached to the fabric instead of using a flooding mechanism. In this manner, the fabric control plane node(s) 510 can operate as a single source of truth about where every endpoint attached to the network fabric 520 is located at any point in time. In addition to tracking specific endpoints (e.g., /32 address for IPv4, /528 address for IPv6, etc.), the fabric control plane node(s) 510 can also track larger summarized routers (e.g., IP/mask). This flexibility can help in summarization across fabric sites and improve overall scalability.

The fabric border nodes 522 can connect the network fabric 520 to traditional Layer 3 networks (e.g., non-fabric networks) or to different fabric sites. The fabric border nodes 522 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 522 can also exchange reachability and policy information with fabric control plane nodes of different fabric sites. The fabric border nodes 522 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 524 can operate as pure Layer 3 forwarders that connect the fabric border nodes 522 to the fabric edge nodes 526 and provide the Layer 3 underlay for fabric overlay traffic.

The fabric edge nodes 526 can connect endpoints to the network fabric 520 and can encapsulate/de-capsulate and forward traffic from these endpoints to and from the network fabric. The fabric edge nodes 526 may operate at the perimeter of the network fabric 520 and can be the first points for the attachment of users, devices, and things and the implementation of policy. In some embodiments, the network fabric 520 can also include fabric extended nodes (not shown) for attaching downstream non-fabric Layer 2 network devices to the network fabric 520 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 526 for communication to outside subnets.

In this example, the network fabric can represent a single fabric site deployment which can be differentiated from a multi-site fabric deployment as discussed further below with respect to FIG. 5.

In some embodiments, all subnets hosted in a fabric site can be provisioned across every fabric edge node 526 in that fabric site. For example, if the subnet 10.10.10.0/24 is provisioned in a given fabric site, this subnet may be defined across all of the fabric edge nodes 526 in that fabric site, and endpoints located in that subnet can be placed on any fabric edge node 526 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Computer Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 522, 524, and 526.

The enterprise network 500 can also include wired endpoints 530A, 530C, 530D, and 530F and wireless endpoints 530B and 530E (collectively, 530). The wired endpoints 530A, 530C, 530D, and 530F can connect by wire to fabric edge nodes 526A, 526C, 526D, and 526F, respectively, and the wireless endpoints 530B and 530E can connect wirelessly to wireless access points 528B and 528E (collectively, 528), respectively, which in turn can connect by wire to fabric edge nodes 526B and 526E, respectively. In some embodiments, Cisco Aironet® access points, Cisco Meraki® MR access points, and/or other Cisco DNA™-ready access points can operate as the wireless access points 528.

The endpoints 530 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 530 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 520 can support wired and wireless access as part of a single integrated infrastructure such that connectivity, mobility, and policy enforcement behavior are similar or the same for both wired and wireless endpoints. This can bring a unified experience for users, devices, and things that are independent of the access media.

In integrated wired and wireless deployments, control plane integration can be achieved with the WLC(s) 508 notifying the fabric control plane node(s) 510 of joins, roams, and disconnects by the wireless endpoints 530 such that the fabric control plane node(s) can have connectivity information about both wired and wireless endpoints in the network fabric 520, and can serve as the single source of truth for endpoints connected to the network fabric. For data plane integration, the WLC(s) 508 can instruct the fabric wireless access points 528 to form a VXLAN overlay tunnel to their adjacent fabric edge nodes 526. The AP VXLAN tunnel can carry segmentation and policy information to and from the fabric edge nodes 526, allowing connectivity and functionality identical or similar to that of a wired endpoint. When the wireless endpoints 530 join the network fabric 520 via the fabric wireless access points 528, the WLC(s) 508 can onboard the endpoints into the network fabric 520 and inform the fabric control plane node(s) 510 of the endpoints' Media Access Control (MAC) addresses. The WLC(s) 508 can then instruct the fabric wireless access points 528 to form VXLAN overlay tunnels to the adjacent fabric edge nodes 526. Next, the wireless endpoints 530 can obtain IP addresses for themselves via Dynamic Host Configuration Protocol (DHCP). Once that completes, the fabric edge nodes 526 can register the IP addresses of the wireless endpoint 530 to the fabric control plane node(s) 510 to form a mapping between the endpoints' MAC and IP addresses, and traffic to and from the wireless endpoints 530 can begin to flow.

FIG. 6 illustrates an example of a logical architecture 600 for an enterprise network (e.g., the enterprise network 500). One of ordinary skill in the art will understand that, for the logical architecture 600 and any system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 600 includes a management layer 602, a controller layer 620, a network layer 630 (such as embodied by the network fabric 520), a physical layer 640 (such as embodied by the various elements of FIG. 5), and a shared services layer 650.

The management layer 602 can abstract the complexities and dependencies of other layers and provide a user with tools and workflows to manage an enterprise network (e.g., the enterprise network 500). The example automation workflows 200 and 400 provided in FIGS. 2 and 4 respectively, may be implemented at the management layer 602. The management layer 602 can include a user interface 604, design functions 606, policy functions 608, provisioning functions 610, assurance functions 612, platform functions 614, and base automation functions 616. The user interface 100 and 300 presented in FIGS. 1 and 3, may be regarded as user interface components of a management layer that implements the automation functionalities described in accordance with some embodiments of the present invention. The user interface 604 can provide a user with a single point to manage and automate the network. The user interface 604 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or another suitable interface in which the user can configure network infrastructure, devices, and things that are cloud-managed; provide user preferences; specify policies, enter data; review statistics; configure interactions or operations; and so forth. The user interface 604 may also provide visibility information, such as views of a network, network infrastructure, computing devices, and things. For example, the user interface 604 can provide a view of the status or conditions of the network, the operations taking place, services, performance, topology or layout, protocols implemented, running processes, errors, notifications, alerts, network structure, ongoing communications, data analysis, and so forth.

The design functions 606 can include tools and workflows for managing site profiles, maps, and floor plans, network settings, and IP address management, among others. The policy functions 608 can include tools and workflows for defining and managing network policies. The provisioning functions 610 can include tools and workflows for deploying the network. The assurance functions 612 can use machine learning and analytics to provide end-to-end visibility of the network by learning from the network infrastructure, endpoints, and other contextual sources of information. The platform functions 614 can include tools and workflows for integrating the network management system with other technologies. The base automation functions 616 can include tools and workflows to support the policy functions 608, the provisioning functions 610, the assurance functions 612, and the platform functions 614.

In some embodiments, the design functions 606, the policy functions 608, the provisioning functions 610, the assurance functions 612, the platform functions 614, and the base automation functions 616 can be implemented as microservices in which respective software functions are implemented in multiple containers communicating with each rather than amalgamating all tools and workflows into a single software binary. Each of the design functions 606, policy functions 608, provisioning functions 610, assurance functions 612, and platform functions 614 can be viewed as a set of related automation microservices to cover the design, policy authoring, provisioning, assurance, and cross-platform integration phases of the network lifecycle. The base automation functions 614 can support the top-level functions by allowing users to perform certain network-wide tasks.

Returning to FIG. 6, the controller layer 620 can comprise subsystems for the management layer 620 and may include a network control platform 622, a network data platform 624, and AAA services 626. These controller subsystems can form an abstraction layer to hide the complexities and dependencies of managing many network elements and protocols.

The network control platform 622 can provide automation and orchestration services for the network layer 630 and the physical layer 640, and can include the settings, protocols, and tables to automate management of the network and physical layers. For example, the network control platform 630 can provide the design functions 606, the provisioning functions 608 612. The fully automated end-to-end migration process flow may be implemented using some of the functionalities provided by the network control platform 622. In addition, the network control platform 630 can include tools and workflows for discovering switches, routers, wireless controllers, and other network infrastructure devices (e.g., the network discovery tool); maintaining network and endpoint details, configurations, and software versions (e.g., the inventory management tool); Plug-and-Play (PnP) for automating deployment of network infrastructure (e.g., the network PnP tool), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. In some embodiments of the present technology, the automatic migration initiation process, that may be triggered by a user input, may leverage the Plug-and-Play (PnP) feature made available via network control platform 630. The network control platform 622 can communicate with network elements using Network Configuration (NETCONF)/Yet Another Next Generation (YANG), Simple Network Management Protocol (SNMP), Secure Shell (SSH)/Telnet, and so forth. In some embodiments, the Cisco® Network Control Platform (NCP) can operate as the network control platform 622

The network data platform 624 can provide for network data collection, analytics, and assurance, and may include the settings, protocols, and tables to monitor and analyze network infrastructure and endpoints connected to the network. The network data platform 624 can collect multiple types of information from network infrastructure devices, including Syslog, SNMP, NetFlow, Switched Port Analyzer (SPAN), and streaming telemetry, among others. The network data platform 624 can also collect use contextual information shared from In some embodiments, one or more Cisco DNA™ Center appliances can provide the functionalities of the management layer 610, the network control platform 622, and the network data platform 624. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third-party vendors. The Cisco DNA™ Center appliances can also be cloud-tethered to provide for the upgrade of existing functions and additions of new packages and applications without having to manually download and install them.

The AAA services 626 can provide identity and policy services for the network layer 630 and physical layer 640, and may include the settings, protocols, and tables to support endpoint identification and policy enforcement services. The AAA services 626 can provide tools and workflows to manage virtual networks and security groups and to create group-based policies and contracts. The AAA services 626 can identify and profile network infrastructure devices and endpoints using AAA/RADIUS, 602.1X, MAC Authentication Bypass (MAB), web authentication, and EasyConnect, among others. The AAA services 626 can also collect and use contextual information from the network control platform 622, the network data platform 624, and the shared services 650, among others. In some embodiments, Cisco® ISE can provide the AAA services 626.

The network layer 630 can be conceptualized as a composition of two layers, an underlay 634 comprising physical and virtual network infrastructure (e.g., routers, switches, WLCs, etc.) and a Layer 3 routing protocol for forwarding traffic, and an overlay 632 comprising a virtual topology for logically connecting wired and wireless users, devices, and things and applying services and policies to these entities. Network elements of the underlay 634 can establish connectivity between each other, such as via Internet Protocol (IP). The underlay may use any topology and routing protocol.

In some embodiments, the network controller 504 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 632 can be a logical, virtualized topology built on top of the physical underlay 634, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane is where intent can be translated into network policy. That is, the policy plane is where the network operator can instantiate logical network policy based on services offered by the network fabric 520, such as security segmentation services, quality of service (QoS), capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNI) and Scalable Group Tag (SGT) fields in packet headers. The network fabric 520 can support both macro-segmentation and micro-segmentation. Macro-segmentation logically separates a network topology into smaller virtual networks by using a unique network identifier and separate forwarding tables. This can be instantiated as a virtual routing and forwarding (VRF) instance and referred to as a virtual network (VN). That is, a VN is a logical network instance within the network fabric 520 defined by a Layer 3 routing domain and can provide both Layer 2 and Layer 3 services (using the VXLAN VNI to provide both Layer 2 and Layer 3 segmentation). Micro-segmentation logically separates user or device groups within a VN, by enforcing source to destination access control permissions, such as by using access control lists (ACLs). A scalable group is a logical object identifier assigned to a group of users, devices, or things in the network fabric 520. It can be used as source and destination classifiers in Scalable Group ACLs (SGACLs). The SGT can be used to provide address-agnostic group-based policies.

In some embodiments, the fabric control plane node 510 may implement the Locator/Identifier Separation Protocol (LISP) to communicate with one another and with the management cloud 502. Thus, the control plane nodes may operate a host tracking database, a map server, and a map resolver. The host tracking database can track the endpoints 530 connected to the network fabric 520 and associate the endpoints to the fabric edge nodes 526, thereby decoupling an endpoint's identifier (e.g., IP or MAC address) from its location (e.g., closest router) in the network.

The physical layer 640 can comprise network infrastructure devices, such as switches and routers 510, 522, 524, and 526 and wireless elements 508 and 528 and network appliances, such as the network controller appliance(s) 504, and the AAA appliance(s) 506.

The shared services layer 650 can provide an interface to external network services, such as cloud services 652; Domain Name System (DNS), DHCP, IP Address Management (IPAM), and other network address management services 654; firewall services 656; Network as a Sensor (Naas)/Encrypted Threat Analytics (ETA) services; and Virtual Network Functions (VNFs) 660; among others. The management layer 602 and/or the controller layer 620 can share identity, policy, forwarding information, and so forth via the shared services layer 650 using APIs.

FIG. 7 illustrates an example of a physical topology for a multi-site enterprise network 700. In this example, the network fabric comprises fabric sites 720A and 720B. The fabric site 720A can include a fabric control node 710A, fabric border nodes 722A and 722B, fabric intermediate nodes 724A and 724B (shown here in dashed line and not connected to the fabric border nodes or the fabric edge nodes for simplicity), and fabric edge nodes 726A-D. The fabric site 720B can include a fabric control node 710B, fabric border nodes 722C-E, fabric intermediate nodes 724C and 724D, and fabric edge nodes 726D-F. Multiple fabric sites corresponding to a single fabric, such as the network fabric of FIG. 7, can be interconnected by a transit network. A transit network can be a portion of a network fabric that has its own control plane nodes and border nodes but does not have edge nodes. In addition, a transit network shares at least one border node with each fabric site that it interconnects.

In general, a transit network connects a network fabric to the external world. There are several approaches to external connectivity, such as a traditional IP network 736, traditional WAN 738A, Software-Defined WAN (SD-WAN) (not shown), or Software-Defined Access (SD-Access) 738B. Traffic across fabric sites, and to other types of sites, can use the control plane and data plane of the transit network to provide connectivity between these sites. A local border node can operate as the handoff point from the fabric site, and the transit network can deliver traffic to other sites. The transit network may use additional features. For example, if the transit network is a WAN, then features like performance routing may also be used. To provide end-to-end policy and segmentation, the transit network should be cable of carrying endpoint context information (e.g., VRF, SGT) across the network. Otherwise, a re-classification of the traffic may be needed at the destination site border.

The local control plane in a fabric site may only hold state relevant to endpoints that are connected to edge nodes within the local fabric site. The local control plane can register local endpoints via local edge nodes, as with a single fabric site (e.g., the network fabric 520). An endpoint that isn't explicitly registered with the local control plane may be assumed to be reachable via border nodes connected to the transit network. As such, the identification of the default cloud controller that may serve as a final cloud hosting endpoint for a network device being migrated onto the cloud (as described in accordance with some embodiments of the present technology and further depicted in example illustrations of FIGS. 2 and 3) may be required to effectively integrate the device in the cloud network. In some embodiments, the local control plane may not hold state for endpoints attached to other fabric sites such that the border nodes do not register information from the transit network. In this manner, the local control plane can be independent of other fabric sites, thus enhancing the overall scalability of the network.

The control plane in the transit network can hold summary state for all fabric sites that it interconnects. This information can be registered to the transit control plane by a border from different fabric sites. The border nodes can register EID information from the local fabric site into the transit network control plane for summary EIDs only and thus further improve scalability.

The multi-site enterprise network 700 can also include a shared services cloud 732. The shared services cloud 732 can comprise one or more network controller appliances 704, one or more AAA appliances 706, and other shared servers (e.g., DNS; DHCP; IPAM; SNMP and other monitoring tools; NetFlow, Syslog, and other data collectors, etc.) may reside. These shared services can generally reside outside of the network fabric and in a global routing table (GRT) of an existing network. In this case, some method of inter-VRF routing may be required. One option for inter-VRF routing is to use a fusion router, which can be an external router that performs inter-VRF leaking (e.g., import/export of VRF routes) to fuse the VRFs together. Multi-Protocol can be used for this route exchange since it can inherently prevent routing loops (e.g., using the AS_PATH attribute). Other routing protocols can also be used but may require complex distribute-lists and prefix-lists to prevent loops.

However, there can be several disadvantages in using a fusion router to achieve inter-VN communication, such as route duplication because routes leaked from one VRF to another are programmed in hardware tables and can result in more TCAM utilization, manual configuration at multiple touch points wherever route-leaking is implemented, loss of SGT context because SGTs may not be maintained across VRFs and must be re-classified once the traffic enters the other VRF, and traffic hairpinning because traffic may need to be routed to the fusion router, and then back to the fabric border node.

SD-Access Extranet can provide a flexible and scalable method for achieving inter-VN communications by avoiding route duplication because inter-VN lookup occurs in the fabric control plane (e.g., software) such that route entries do not need to be duplicated in hardware; providing a single touchpoint because the network management system (e.g., Cisco DNA™ Center) can automate the inter-VN lookup policy, making it a single point of management; maintaining SGT context because the inter-VN lookup occurs in the control plane node(s) (e.g., software), and avoids hairpinning because inter-VN forwarding can occur at the fabric edge (e.g., the same intra-VN) so traffic does not need to hairpin at the border node. Another advantage is that a separate VN can be made for each of the common resources that are needed (e.g., a Shared Services VN, an Internet VN, a data center VN, etc.).

Figure 8:
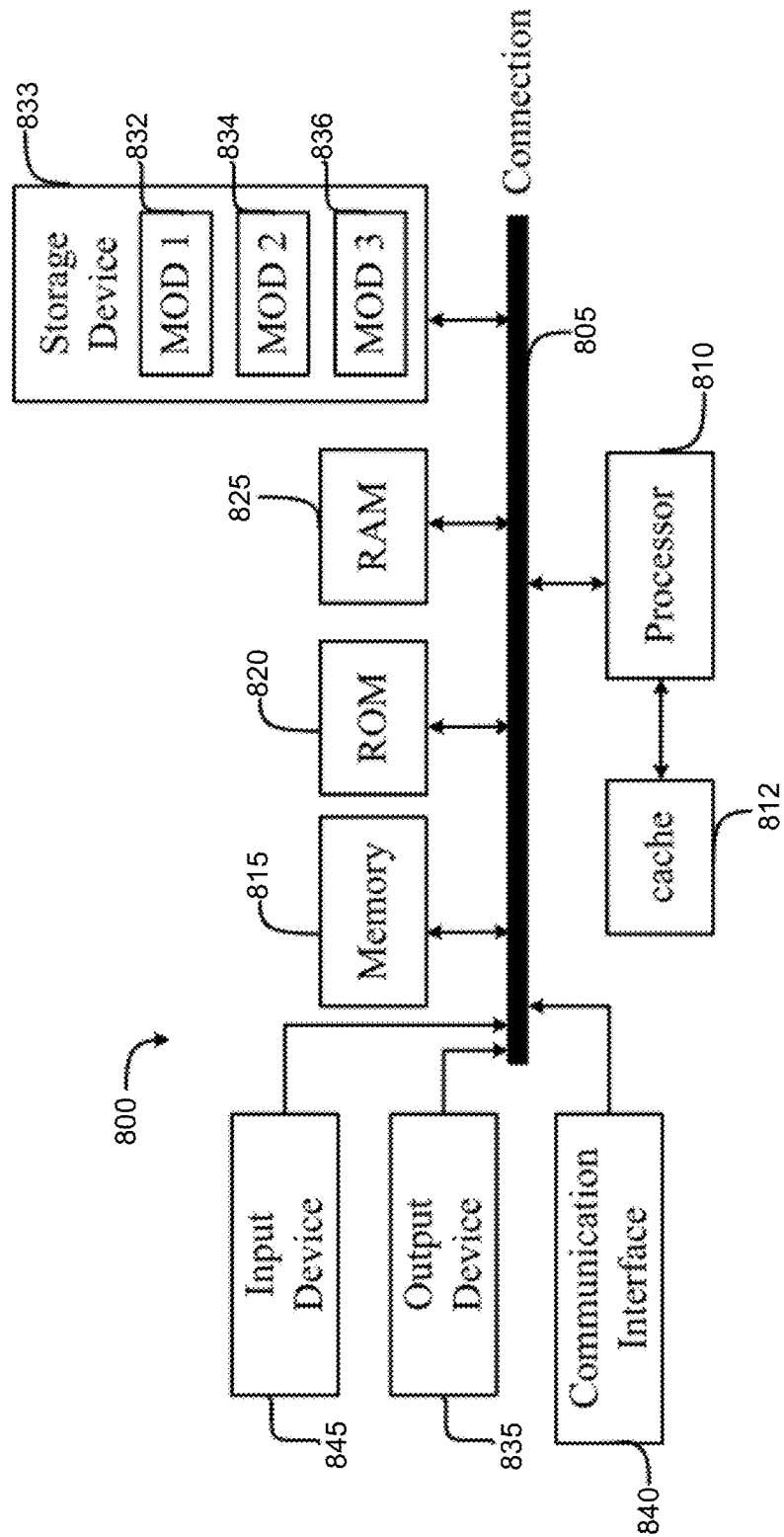
FIG. 8 illustrates an example network device, in accordance with some embodiments of the present technology.
Figure 9:
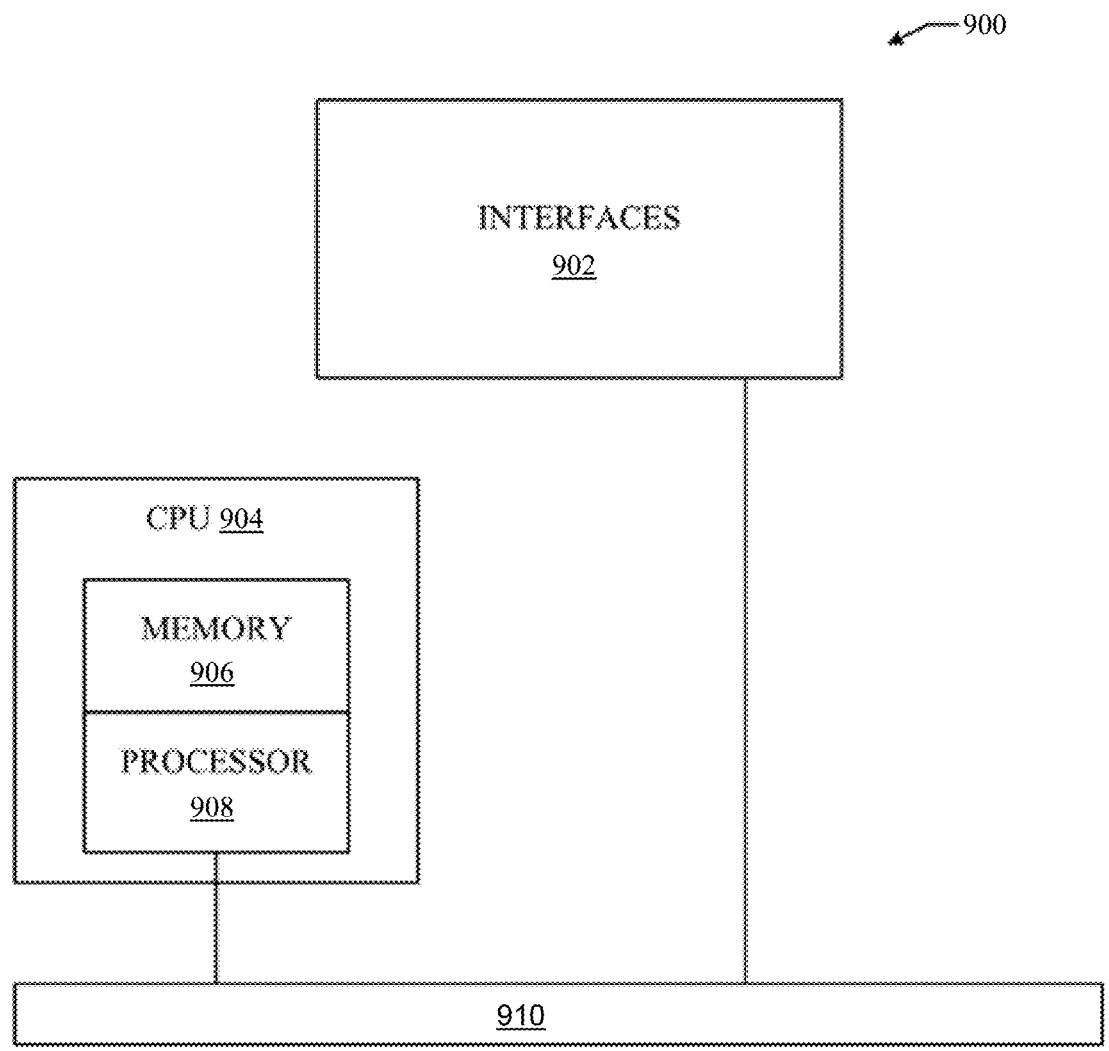
FIG. 9 illustrates an example architecture of a computing device, in accordance with some embodiments of the present technology.

The disclosure now turns to FIGS. 8 and 9, which illustrate example architectures of computing an network devices, such as client computers, switches, routers, servers, and so forth.

FIG. 8 illustrates a computing system architecture 800 including components in electrical communication with each other using a connection 805, such as a bus. System 800 includes a processing unit (CPU or processor) 810 and a system connection 805 that couples various system components including the system memory 815, such as read-only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware or software service, such as service 1 832, service 2 834, and service 3 836 stored in storage device 830, configured to control the processor 810 as well as a special-purpose processor where software instructions are incorporated into the actual processor design. The processor 810 may be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read-only memory (ROM) 820, and hybrids thereof.

The storage device 830 can include services 832, 834, 836 for controlling the processor 810. Other hardware or software modules are contemplated. The storage device 830 can be connected to the system connection 805. In one aspect, a hardware module that performs a particular function can include the software component stored in a computer-readable medium in connection with the necessary hardware components, such as the processor 810, connection 805, output device 835, and so forth, to carry out the function.

FIG. 9 illustrates an example network device 900 suitable for performing switching, routing, assurance, and other networking operations. Network device 900 includes a central processing unit (CPU) 904, interfaces 902, and a connection 910 (e.g., a PCI bus). When acting under the control of appropriate software or firmware, the CPU 904 is responsible for executing packet management, error detection, and/or routing functions. The CPU 904 preferably accomplishes all these functions under the control of software including an operating system and any appropriate applications software. CPU 904 may include one or more processors 908, such as a processor from the INTEL X106 family of microprocessors. In some cases, processor 908 can be specially designed hardware for controlling the operations of network device 900. In some cases, a memory 906 (e.g., non-volatile RAM, ROM, TCAM, etc.) also forms part of CPU 904. However, there are many different ways in which memory could be coupled to the system. In some cases, the network device 900 can include a memory and/or storage hardware, such as TCAM, separate from CPU 904. Such memory and/or storage hardware can be coupled with the network device 900 and its components via, for example, connection 910.

The interfaces 902 are typically provided as modular interface cards (sometimes referred to as "line cards"). Generally, they control the sending and receiving of data packets over the network and sometimes support other peripherals used with the network device 900. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 904 to efficiently perform routing computations, network diagnostics, security functions, etc.

Although the system shown in FIG. 9 is one specific network device of the present disclosure, it is by no means the only network device architecture on which the concepts herein can be implemented. For example, an architecture having a single processor that handles communications as well as routing computations, etc., can be used. Further, other types of interfaces and media could also be used with the network device 900.

Regardless of the network device's configuration, it may employ one or more memories or memory modules (including memory 906) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 906 could also hold various software containers and virtualized execution environments and data.

The network device 900 can also include an application-specific integrated circuit (ASIC), which can be configured to perform routing, switching, and/or other operations. The ASIC can communicate with other components in the network device 900 via the connection 910, to exchange data and signals and coordinate various types of operations by the network device 900, such as routing, switching, and/or data storage operations, for example.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
   receiving, by a first server on a first management platform, a migration request associated with an identifier for a device on a second management platform;
   mapping the identifier to a client account on the first management platform;
   directing the device to boot up using a different software image than a previously-installed software image on the device, wherein the different software image is provided by a second server on the first management platform, and wherein the different software image is identified for the device based on the client account, the client account specifying the different software image as a recommended software image to be deployed on the device for the first management platform;
   updating, by the first server, an existing configuration of the device to a configuration having a compatibility with the different software image provided by the second server; and
   migrating the device to a host controller on the first management platform identified from the client account, wherein the client account specifies the host controller as a recommended host controller for the device.

2. The computer-implemented method of claim 1, wherein the first server corresponds to a cloud-based onboarding server, wherein the cloud-based onboarding server hosts a Plug and Play (PnP) service for communicating with a PnP software agent.

3. The computer-implemented method of claim 1, wherein migrating the device to the host controller comprises redirecting the device to the host controller.

4. The computer-implemented method of claim 1, wherein the identifier for the device corresponds to at least one of a serial number and an IP address.

5. The computer-implemented method of claim 1, wherein the different software image replaces the previously-installed software image associated with the device.

6. The computer-implemented method of claim 1, wherein the second server corresponds to a cloud-based central management server, and wherein the cloud-based central management server is implemented in a Digital Network Architecture Center (DNA-C).

7. The computer-implemented method of claim 1, wherein the host controller on the first management platform corresponds to a default cloud-based controller associated with the client account.

8. The computer-implemented method of claim 1, wherein in addition to the migration request, a copy of the existing configuration of the device is also received by the first server.

9. The computer-implemented method of claim 1, wherein the migration request for the device on the second management platform is initiated by a PnP software agent on the device receiving an input from a user.

10. The computer-implemented method of claim 9, wherein the input from the user comprises a Command Line Interface (CLI) command.

11. The computer-implemented method of claim 10, wherein a CLI wrapper on the device enables the receiving of the CLI command by the PnP software agent.

12. The computer-implemented method of claim 11, wherein the CLI wrapper is implemented as a graphical user interface.

13. A system comprising:
one or more processors; and
at least one computer-readable storage medium having stored therein instructions which, when executed by the one or more processors, cause the one or more processors to:
map, to a client account on a first management platform, an identifier received in association with a migration request from a device on a second management platform;
direct the device on the second management platform to boot up with a software image compatible with the first management platform, wherein the software image is identified for the device based on the client account, the client account specifying the software image as a recommended software image to be deployed on the device for the first management platform;
convert an input configuration for the device on the second management platform into an output configuration compatible with the first management platform; and
migrate the device to a host controller on the first management platform, the host controller being associated with the client account, wherein the client account specifies the host controller as a recommended host controller for the device.

14. The system of claim 13, wherein at least one of the first management platform or the second management platform corresponds to at least one of an on-premise and a cloud-based management platform.

15. The system of claim 13, wherein the first management platform corresponds to a cloud-based management platform, and wherein the cloud-based management platform is implemented as a part of an intent-based network.

16. The system of claim 13, wherein the identifier comprises at least one of a serial number associated with the device or an IP address associated with the device.

17. The system of claim 13, wherein the migration request from the device on the second management platform is initiated by a Plug and Play (PnP) software agent on the device responsive to a user input.

18. The system of claim 17, wherein the user input corresponds to a Command Line Interface (CLI) command provided to the PnP software agent through a CLI wrapper.

19. The system of claim 18, wherein the CLI wrapper is implemented as a graphical user interface.

20. A non-transitory computer-readable storage medium having stored thereon instructions which, when executed by one or more processors, cause the one or more processors to:
receive, by a first server on a first management platform, a migration request associated with an identifier for a device on a second management platform;
map the identifier to a client account on the first management platform;
direct the device to boot up using a different software image than a previously-installed software image on the device, wherein the different software image is provided by a second server on the first management platform, and wherein the different software image is identified for the device based on the client account, the client account specifying the different software image as a recommended software image to be deployed on the device for the first management platform;
update, by the first server, an existing configuration of the device to a configuration having a compatibility with the different software image provided by the second server; and
migrate the device to a host controller on the first management platform identified from the client account, wherein the client account specifies the host controller as a recommended host controller for the device.

* * * * *